US006779106B1

(12) United States Patent
Blandy

(10) Patent No.: US 6,779,106 B1
(45) Date of Patent: Aug. 17, 2004

(54) APPARATUS AND METHOD FOR AN ENHANCED INTEGER DIVIDE IN AN IA64 ARCHITECTURE

(75) Inventor: Geoffrey Owen Blandy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 09/671,873

(22) Filed: Sep. 28, 2000

(51) Int. Cl.$^7$ ................................................ G06F 7/52
(52) U.S. Cl. ...................................... 712/221; 712/244
(58) Field of Search ............................... 712/221, 222, 712/220, 24, 23, 25, 26, 244; 708/552, 650

(56) References Cited

U.S. PATENT DOCUMENTS

| | | | |
|---|---|---|---|
| 4,435,753 A | 3/1984 | Rizzi | 364/200 |
| 4,642,764 A | 2/1987 | Auslander et al. | 364/300 |
| 4,782,444 A | 11/1988 | Munshi et al. | 364/300 |
| 4,833,599 A | 5/1989 | Colwell et al. | 364/200 |
| 4,961,141 A | 10/1990 | Hopkins et al. | 364/200 |
| 5,057,837 A | 10/1991 | Colwell et al. | 341/55 |
| 5,448,746 A | 9/1995 | Eickemeyer et al. | 395/800 |
| 5,497,499 A | 3/1996 | Garg et al. | 395/800 |
| 5,502,827 A * | 3/1996 | Yoshida | 712/244 |
| 5,504,932 A | 4/1996 | Vassiliadis et al. | 395/800 |
| 5,574,928 A * | 11/1996 | White et al. | 712/23 |
| 5,600,810 A | 2/1997 | Ohkami | 395/567 |
| 5,613,121 A | 3/1997 | Blainey | 395/709 |
| 5,669,001 A | 9/1997 | Moreno | 395/706 |
| 5,761,470 A | 6/1998 | Yoshida | 395/386 |
| 5,812,850 A | 9/1998 | Wimble | 395/704 |
| 5,819,058 A | 10/1998 | Miller et al. | 395/386 |
| 5,826,054 A | 10/1998 | Jacobs et al. | 395/389 |

(List continued on next page.)

OTHER PUBLICATIONS

Fitzgerald et al., "Marmot: An Optimizing Compiler for Java", Microsoft Research, Jun. 16, 1999, Technical Report MSR–TR–99–33, pp. 1–29.

Azevedo et al., "Java Annotation–Aware Just–In–Time (AJIT) Compilation System", ACM 1999, San Francisco, CA, USA, pp. 142–151.

Larus et al., "SPIM S20: A MIPS R2000 Simulator", Computer Sciences Department, University of Wisconsin, Madison, copyright 1990–1997, pp. 1–25.

Aho et al., "Compliers: Principles, Techniques, and Tools", copyright 1986, Bell Telephone Labs, Inc., 4 pages.

Sinclair et al., "ASIC Design for Conditional Nested Loops with Predicate Registers", Aug. 11, 1999, Circuits and Systems, 1999, $42^{nd}$ Midwest Symposium, vol. 2, pp. 874–877.

"The Java Virtual Machine Specification", Sun Mirosystems, Inc., copyright 1997, http://java.sun.com/docs/books/vmspec/html/Instructions2.doc14.html.

Fernandez, "Simple and Effective Link–Time Optimization of Modula–3 Programs", Nov. 7, 1994, pp. 1–7.

Ishizaki et al., Design, Implementation, and Evaluation of Optimizations in a Just–In–Time Complier, ACM, Jun. 1999, pp. 119–122.

Primary Examiner—Henry W. H. Tsai
(74) Attorney, Agent, or Firm—Duke W. Yee; Diana L. Roberts; Stephen J. Walder, Jr.

(57) ABSTRACT

An apparatus and method for performing integer divide operations in an IA64 architecture based data processing system is provided. The apparatus and method insert integer divide checks in place of NOP instructions in the instruction bundles associated with integer divide operations. The checks serve to identify typically encountered integer divide operations. Based on such identifications, the integer divide operation may be short-circuited such that the appropriate result may be returned without having to complete the integer divide operation.

30 Claims, 3 Drawing Sheets

U.S. PATENT DOCUMENTS

| | | | |
|---|---|---|---|
| 5,828,886 A | 10/1998 | Hayashi | 395/709 |
| 5,848,246 A * | 12/1998 | Gish | 709/228 |
| 5,922,065 A | 7/1999 | Hull et al. | 712/24 |
| 5,966,537 A | 10/1999 | Ravichandran | 395/709 |
| 6,018,799 A | 1/2000 | Wallace et al. | 712/300 |
| 6,035,120 A | 3/2000 | Ravichandran | 395/705 |
| 6,061,781 A * | 5/2000 | Jain et al. | 712/221 |
| 6,101,592 A * | 8/2000 | Pechanek et al. | 712/20 |
| 6,108,771 A | 8/2000 | Gaertner et al. | 712/217 |
| 6,110,226 A | 8/2000 | Bothner | 717/7 |
| 6,151,703 A | 11/2000 | Crelier | 717/5 |
| 6,158,048 A | 12/2000 | Lueh et al. | 717/9 |
| 6,237,077 B1 | 5/2001 | Sharangpani et al. | 712/24 |
| 6,240,510 B1 | 5/2001 | Yeh et al. | 712/236 |
| 6,286,135 B1 | 9/2001 | Santhanam | 717/9 |
| 6,286,346 B1 * | 9/2001 | Hocken et al. | 70/260 |
| 6,311,325 B1 | 10/2001 | Levine et al. | 717/4 |
| 6,317,872 B1 | 11/2001 | Gee et al. | 717/7 |
| 6,317,876 B1 | 11/2001 | Kunz et al. | 717/9 |
| 6,321,322 B1 * | 11/2001 | Pechanek et al. | 712/24 |
| 6,324,687 B1 | 11/2001 | Beadle et al. | 717/6 |
| 6,336,213 B1 | 1/2002 | Beadle et al. | 717/5 |
| 6,339,841 B1 | 1/2002 | Merrick et al. | 717/10 |
| 6,385,660 B2 | 5/2002 | Griesemer et al. | 709/315 |
| 6,408,433 B1 | 6/2002 | Click, Jr. et al. | 717/154 |
| 6,412,105 B1 | 6/2002 | Maslennikov et al. | 717/9 |
| 6,427,234 B1 | 7/2002 | Chambers et al. | 717/140 |
| 6,442,676 B1 * | 8/2002 | Guenthner | 712/210 |
| 6,446,195 B1 * | 9/2002 | Ganapathy et al. | 712/221 |
| 6,466,972 B1 | 10/2002 | Paul et al. | 709/222 |
| 6,487,601 B1 | 11/2002 | Hubacher et al. | 709/229 |
| 6,507,946 B2 | 1/2003 | Alexander, III et al. | 717/145 |
| 6,539,473 B1 | 3/2003 | Hubacher et al. | 713/2 |
| 6,560,624 B1 * | 5/2003 | Otani et al. | 708/655 |
| 6,567,974 B1 | 5/2003 | Czajkowski | 717/151 |
| 6,571,385 B1 | 5/2003 | Muthukumar et al. | 717/150 |
| 6,604,167 B1 | 8/2003 | Blandy et al. | 711/100 |
| 6,622,234 B1 * | 9/2003 | Pechanek et al. | 712/22 |
| 6,640,313 B1 | 10/2003 | Quach | 714/10 |
| 6,675,375 B1 | 1/2004 | Czajkowski | 717/151 |

* cited by examiner

```
/*----------------------------------------------+
 | divide r32/r33 return results in r8
 +----------------------------------------------*/
IntergerDivide:
{.mfi
        setf.sig    f6=r32                          //m
        nop.f       0                               //f
        cmp.eq      p6, p0=10, r33                  //o  <----
} {.mib
        setf.sig    f7=r33                          //m
        cmp.lt      p7, p0=r32, r33                 //o  <----
(p6)    br.cond.spnt    tryDiv10                    //b  <----
}
        ;;
notPos:
{.mfi
        cmp.lt.and  p7, p0=r0, r32                  //m  <----
        fcvt.xf     f6=f6                           //f
        mov         r9=0x0ffdd                      //o
} {.mfb
        mov         r8=0                            //m  <----
        fcvt.xf     f7=f7                           //f
(p7)    br.ret.spnt b0                              //b  <----
}
        ;;
{.mfi
        setf.exp    f15=r9                          //m
        frcpa.s1    f8, p6=f6, f7       //f
        nop.i       0                               //i
}
        ;;
{.mfi
        cmp.eq      p7, p0=r33, r0                  //m  <----
(p6)    fma.s1      f6=f6, f8, f0                   //f
        nop.i       0                               //i
} {.mfb
        nop.m       0                               //m
(p6)    fnma.s1     f7=f7, f8, f1       //f
(p7)    br.cond.spnt    ThrowArith                  //b  <----
}
        ;;
{.mfi
        nop.m       0                               //m
(p6)    fma.s1      f6=f7, f6, f6                   //f
        nop.i       0                               //i
} {.mfi
        nop.m       0                               //m
(p6)    fma.s1      f7=f7, f7, f15                  //f
        nop.i       0                               //i
}
```

*FIG. 3*

APPARATUS AND METHOD FOR AN ENHANCED INTEGER DIVIDE IN AN IA64 ARCHITECTURE

RELATED APPLICATIONS

The present invention is related to commonly assigned and co-pending U.S. patent application Ser. No. 09/671,876 entitled "APPARATUS AND METHODS FOR IMPROVED DEVIRTUALIZATION OF METHOD CALLS", Ser. No. 09/671,770 entitled "APPARATUS AND METHOD FOR AVOIDING DEADLOCKS IN A MULTI-THREADED ENVIRONMENT", Ser. No. 09/671,973 entitled "APPARATUS AND METHOD FOR IMPLEMENTING SWITCH INSTRUCTIONS IN AN IA64 ARCHITECTURE", Ser. No. 09/671,877 entitled "APPARATUS AND METHOD FOR DETECTING AND HANDLING EXCEPTIONS", Ser. No. 09/671,771 entitled "APPARATUS AND METHOD FOR VIRTUAL REGISTER MANAGEMENT USING PARTIAL DATA FLOW ANALYSIS FOR JUST-IN-TIME COMPILATION", Ser. No. 09/671,874 entitled "APPARATUS AND METHOD FOR CREATING INSTRUCTION GROUPS FOR EXPLICITLY PARALLEL ARCHITECTURES", and Ser. No. 09/671,875 entitled "APPARATUS AND METHOD FOR CREATING INSTRUCTION BUNDLES IN AN EXPLICITLY PARALLEL ARCHITECTURE", filed on even date herewith and hereby incorporated by reference.

BACKGROUND OF THE INVENTION

1. Technical Field

The present invention is directed to an apparatus and method for an enhanced integer divide in an IA64 architecture.

2. Description of Related Art

The combination of instructions required to perform an integer divide in an IA64 architecture provide little opportunity for instruction level parallelism. The standard divide routine has such a degree of inter-instruction dependency that no more than two instructions are ever executed in parallel. Because of this, instruction units are wasting time processing NOPs. Thus, it would be beneficial to have an apparatus and method for performing integer divides in an IA64 architecture which does not waste processing time on NOP instructions.

SUMMARY OF THE INVENTION

The present invention provides an apparatus and method for performing integer divide operations in an IA64 architecture based data processing system. The apparatus and method of the present invention insert integer divide checks in place of NOP instructions in the instruction bundles associated with integer divide operations. The checks serve to identify typically encountered integer divide operations. Based on such identifications, the integer divide operation may be short-circuited such that the appropriate result may be returned without having to complete the integer divide operation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is exemplary code for performing the check instruction insertion of the present invention.

DETAILED DESCRIPTION OF THE PREFERRED EMBODIMENTS

The present invention provides an apparatus and method for performing an enhanced integer divide in an IA64 architecture data processing device. The IA64 architecture data processing device may be a stand-alone device, a client device, a server device, or the like, and may be a part of a distributed network. Thus, the following figures are provided as a description of some of the possible data processing system in which the present invention may be implemented.

Figure 1:
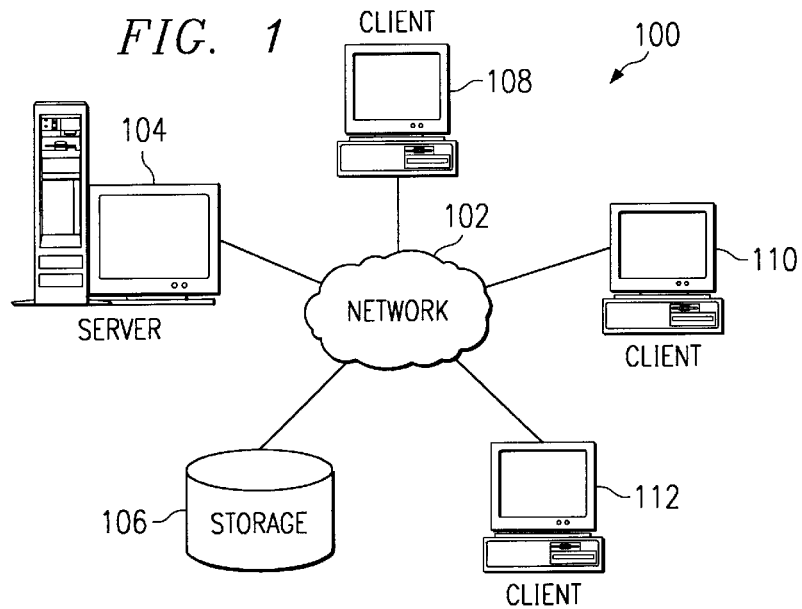
FIG. 1 is an exemplary block diagram of a distributed data processing system according to the present invention.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

Figure 2A:
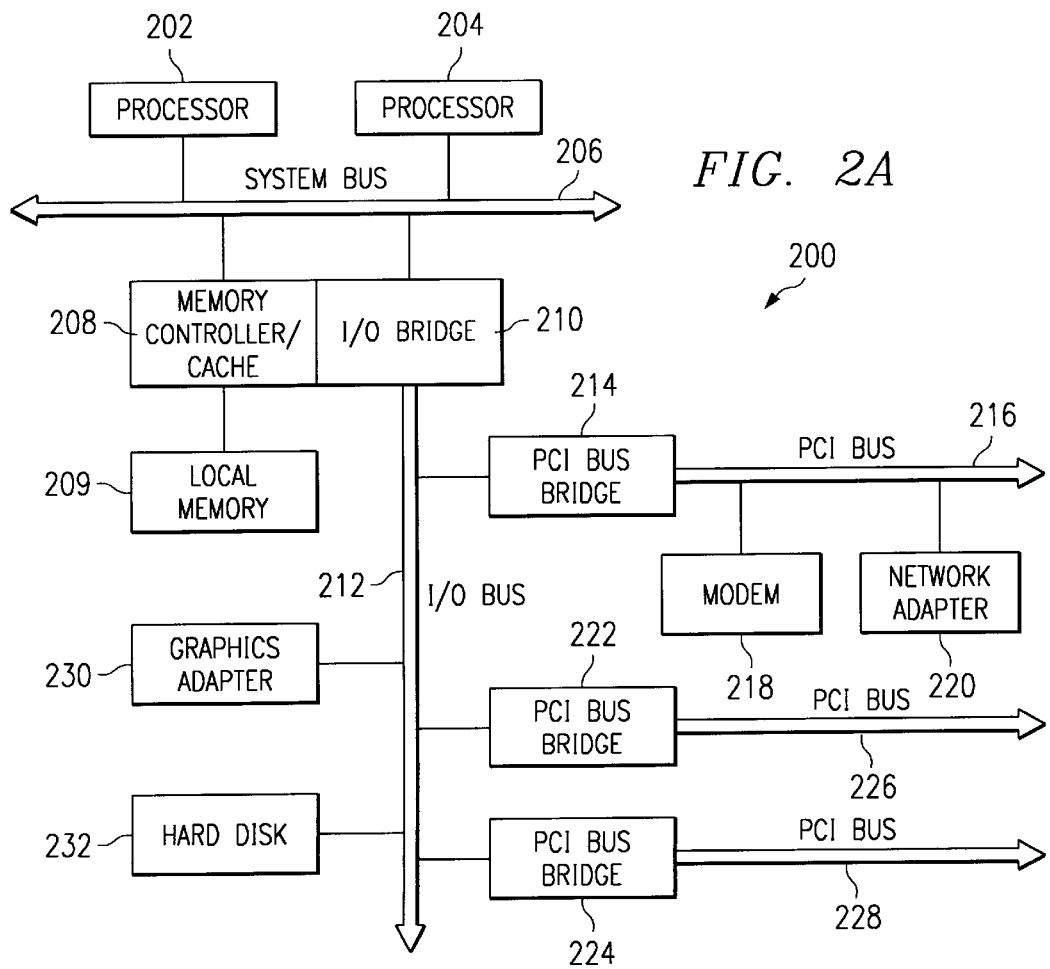
FIG. 2A is an exemplary block diagram of a data processing system according to the present invention.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
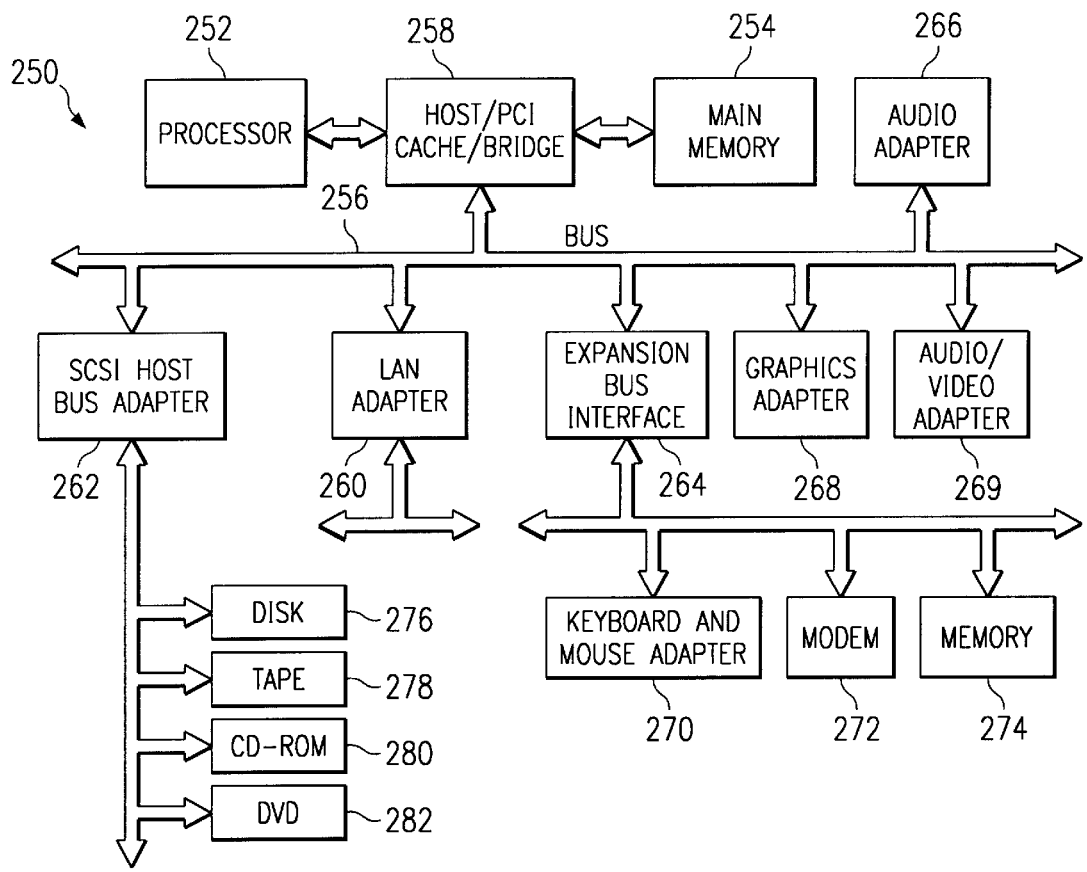
FIG. 2B is an exemplary block diagram of a data processing system according to the present invention.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B.

The operating system may be a commercially available operating system such as OS/2, which is available from International Business Machines Corporation.

An object oriented programming system such as Java may run in conjunction with the operating system and may provide calls to the operating system from Java programs or applications executing on data processing system 250. Instructions for the operating system, the object oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides an apparatus and method for performing an enhanced integer divide operation in an IA64 architecture. Although the present invention may operate on a variety of computer platforms and operating systems, it may also operate within a Java runtime environment. Hence, the present invention may operate in conjunction with a Java virtual machine (JVM) yet within the boundaries of a JVM as defined by Java standard specifications.

The present invention is equally applicable to either a platform specific environment, i.e. a traditional computer application environment loading modules or native methods, or a platform independent environment, such as an interpretive environment, e.g., a Java environment loading classes, methods and the like. The preferred embodiment of the present invention will be described in terms of an IA64 architecture, regardless of the type of operating system being used.

The IA64 architecture is described in the "Intel IA-64 Architecture Software Developer's Manual" available for download from http://developer.intel.com/design/ Ia-64/ downloads /24531702s.htm, which is hereby incorporated by reference. Briefly, IA64 allows a compiler or programmer to explicitly group instructions to be executed concurrently. While the present invention will be described with reference to the Itanium implementation of the IA64 architecture, the present invention is not limited to such. Rather, the present invention is applicable to any implementation of the IA64 architecture.

An IA64 program consists of a sequence of instructions and stops packed in bundles. A bundle is 128 bits in size and contains 3 41-bit instruction slots and a 5 bit template. The template maps the instruction slots to the execution units to which they will be dispatched and identifies instruction group stops within the bundle. A bundle need not include any instruction group stops in which case the three instructions may be executed in parallel with some or all the instructions of the next bundle.

An instruction group is a sequence of instructions starting at a given bundle address and slot number and including all instructions at sequentially increasing slot numbers and bundle addresses up to the first stop, taken branch, or fault. In IA64, instructions may be of six different types:

1) A, Integer Arithmetic Logic Unit (ALU);
2) I, Non-ALU Integer;
3) M, Memory;
4) F, Floating-point;
5) B, Branch; and
6) LX, Long immediate (this is used for generating 64 bit constants).

IA64 execution units may be of four different types:

1) Integer (I-unit), which can execute A, I and LX instructions;
2) Memory (M-unit), which can execute M and A instructions;
3) Floating-point (F-unit), which can execute F instructions; and
4) Branch (B-unit), which can execute B instructions.

In view of the above architecture, and resource limitations of the Itanium implementation of the IA64 architecture, certain combinations of instructions may be grouped for efficient parallel execution by the IA64 architecture execution units. Table 1 shows the various instruction groups that are currently supported by the Itanium implementation of the IA64 architecture. Note that the LX instruction occupies two slots.

| MMF | Memory, Memory, Floating-point |
|---|---|
| MLX | Memory, Long immediate |
| MMI | Memory, Memory, Integer |
| MII | Memory, Integer, Integer |
| MFI | Memory, Floating-point, Integer |
| MMB | Memory, Memory, Branch |
| MFB | Memory, Floating-point, Branch |
| MIB | Memory, Integer, Branch |
| MBB | Memory, Branch, Branch |
| BBB | Branch, Branch, Branch |

Table 1 —Currently Supported Instruction Groups

Because of the architectural limitations of IA64 and the fact that only a subset of possible instruction combinations (see Table 1) are supported by the IA64 architecture, when placing instructions into bundles, sometimes it is necessary to insert what is known as NOP instructions. A NOP instruction is an instruction that performs no function other than to bind an execution unit so that the execution unit does not execute another instruction. NOP instructions are necessary in order to make sure that the instructions are processed in accordance with the supported instruction packaging For example, if a program contains consecutive floating point instructions with no other instruction types intermixed, the floating point instructions would be contained in MMF, MFI or MFB bundles and the non-F slots would be occupied by NOPs.

The NOP instructions waste valuable processing time by binding execution units that could otherwise be used to perform useful work. The present invention provides a mechanism by which these NOP instructions are replaced with instructions used to perform integer divide check operations to thereby increase the efficiency of the overall system. In this way, otherwise wasted processing time is reclaimed and useful work may be performed. The IA64 architecture does not provide an integer divide instruction. Thus, in order to perform an integer divide operation, a number of instructions must be executed to perform the integer division. For example, many instructions must be executed to approximate the divide operation. First, the reciprocal of the numerator is obtained, which must then be multiplied by the dividend, and the reciprocal of the result must then be determined.

The IA64 architecture requires that a floating point execution unit be used to perform the steps above. Thus, the instruction bundles used to perform an integer divide operation in IA64 must be of the types MMF, MFI or MFB, where the M, I and B instructions are NOP instructions. This process is performed several times in order to increase the accuracy of the approximation. Because so many instructions must be executed, many processing cycles are lost to NOP instructions being sent to execution units.

Instrumentation of numerous benchmarks indicate that the conditions of the numerator being smaller than the denominator and the denominator being 10 may account for more than half of integer divisions performed by a typical processor. Thus, if there is a way to perform checks for these and other typical division operations prior to performing an integer divide operation, processor cycles may be saved by "short-circuiting" the operation and returning an appropriate result.

Furthermore, many programming environments, such as Java, require that divide-by-zero throw an exception. Normally an explicit check for divide-by-zero would be performed prior to calling the integer divide routine.

With the present invention, a check for divide-by-zero may be inserted in such a way that the NOP space, described above, is used to perform the check. In this way, instruction path length is not added and the size of the routine is not increased. Moreover, with the present invention, a check for a positive denominator being greater than a positive numerator, a denominator being equal to a numerator, and the like, can be performed early using instruction slots which would otherwise be occupied by NOPs without adding any latency. For example, if either of the two latter conditions prevail, i.e. either the positive denominator is greater than the positive numerator or the denominator is equal to the numerator, the integer divide routine will be "short-circuited" and the appropriate return value (0 or 1) will be generated. By doing so, a minimum of 9 processing cycles may be saved.

An additional early check for a positive numerator and a denominator being 10 (used in formatting big decimals) can be inserted. If such a check prevails, the processing flow may be redirected to a specialized routine that performs a multiply (by 0xccccccccd) and extract instead of an integer divide.

Other types of checks that are typically encountered by a processor may be inserted in NOP positions of instruction groups/bundles in order to optimize the operation of the IA64 architecture based data processing system. For example, divide by 1, division of powers of 2, and the like, may be added without departing from the spirit and scope of the present invention.

With the present invention, when an integer divide routine is called, instruction bundles for performing the integer divide routine are created. As mentioned above, because IA64 does not provide an explicit instruction for an integer divide, the instruction bundles used to perform the integer divide operation are of the types MMF, MFI or MFB, where the M, I and B instructions are NOP instructions.

Thus, in the present invention, when creating the instruction bundles for the integer divide routine, preliminary check instructions are inserted into the NOP instruction slots. For example, in place of the NOP M's, I's and B's, instructions may be inserted for determining if the present integer divide is a divide-by-zero, a positive denominator being greater than a positive numerator, a denominator being equal to a numerator, a positive numerator and a denominator being 10, a divide by 1, division of powers of 2, and other typically encountered division operations. Such checks operate to "short-circuit" the integer divide routine such that the appropriate result is returned without having to execute all of the instructions for completing the integer divide routine.

FIG. 3 provides exemplary code for performing the check instruction insertion described above. The code shown in FIG. 3 is for the IA64 architecture. However, the present invention is not limited to the IA64 architecture and other architectures may be used without departing from the spirit and scope of the present invention.

Figure 4:
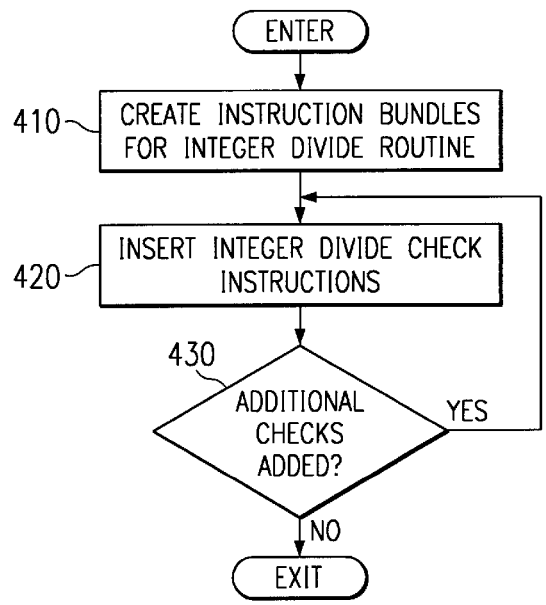
FIG. 4 is a flowchart outlining an exemplary operation of the present invention.

FIG. 4 is a flowchart outlining an exemplary operation for enhancing an integer divide routine according to the present invention. As shown in FIG. 4, the operation starts with instruction bundles of the integer divide routine being created (step 410) and integer divide checks being inserted in place of the NOP instructions in the instruction bundles (step 420). Integer divide checks may be inserted based on a priority order of the integer divide checks, for example. A determination is then made as to whether additional checks can be added that will reduce total latency (step 430). If so, the operation returns to step 420. Otherwise, the operation exits.

Thus, the present invention provides a mechanism by which integer divide operations may be inserted in spaces otherwise occupied by NOP instructions to thereby increase the efficiency of the data processing system. The present invention may be implemented as part of a Java Virtual Machine (JVM) or as a separate hardware/software component. One example of its use would be to replace the standard integer divide routine in the C runtime library, libc.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of performing an integer divide operation in a data processing device, comprising:
   receiving a call to an integer divide routine;
   creating instruction bundles for the integer divide routine; and
   replacing one or more instructions in the instruction bundles with an integer divide check operation.

2. The method of claim 1, wherein the data processing device has an IA64 architecture.

3. The method of claim 1, wherein the integer divide check operation is one of checking for a positive denominator being greater than a positive numerator, a denominator being equal to the numerator, a positive numerator and a denominator being 10, a divide by 1, and division of powers of 2.

4. The method of claim 1, wherein replacing one or more instructions in the instruction bundles with an integer divide check operation is performed based on a priority order of one or more integer divide check operations.

5. The method of claim 1, wherein the method is implemented in a Java Virtual Machine on the data processing device.

6. The method of claim 1, wherein the integer divide check operation is a check for an integer divide condition that is typically encountered.

7. The method of claim 1, further comprising:
   checking the integer divide operation using the integer divide check operation; and
   returning a result of the integer divide operation based on a positive outcome of checking the integer divide operation using the integer divide check operation, wherein the result is returned without completing execution of the integer divide routine, and wherein the result is a result that would have been obtained had execution of the integer divide routine been permitted to complete.

8. The method of claim 1, wherein the integer divide check operation short-circuits the integer divide routine when a result of the integer divide check operation is positive, to thereby output a result without completing the execution of the integer divide routine, wherein the result is a result that would have been obtained had execution of the integer divide routine been permitted to complete.

9. The method of claim 1, wherein replacing one or more instructions with an integer divide check operation is performed repeatedly.

10. The method of claim 1, wherein the one or more instructions are NOP instructions.

11. An apparatus for performing an integer divide operation in a data processing device, comprising:
   means for receiving a call to an integer divide routine;
   means for creating instruction bundles for the integer divide routine; and
   means for replacing one or more instructions in the instruction bundles with an integer divide check operation.

12. The apparatus of claim 11, wherein the data processing device has an IA64 architecture.

13. The apparatus of claim 11, wherein the integer divide check operation is one of checking for a positive denominator being greater than a positive numerator, a denominator being equal to the numerator, a positive numerator and a denominator being 10, a divide by 1, and division of powers of 2.

14. The apparatus of claim 11, wherein the means for replacing one or more instructions in the instruction bundles with an integer divide check operation replaces the one or more instructions based on a priority order of one or more integer divide check operations.

15. The apparatus of claim 11, wherein the means for receiving, means for creating and means for replacing are part of a Java Virtual Machine on the data processing device.

16. The apparatus of claim 11, wherein the integer divide check operation is a check for an integer divide condition that is typically encountered.

17. The apparatus of claim 11, further comprising:
means for checking the integer divide operation using the integer divide check operation; and
means for returning a result of the integer divide operation based on a positive outcome of checking the integer divide operation using the integer divide check operation, wherein the result is returned without completing execution of the integer divide routine, and wherein the result is a result that would have been obtained had execution of the integer divide routine been permitted to complete.

18. The apparatus of claim 11, wherein the integer divide check operation short-circuits the integer divide routine when a result of the integer divide check operation is positive, to thereby output a result without completing the execution of the integer divide routine, wherein the result is a result that would have been obtained had execution of the integer divide routine been permitted to complete.

19. The apparatus of claim 11, wherein the means for replacing one or more instructions with an integer divide check operation performs the replacing of the one or more instructions repeatedly.

20. The apparatus of claim 11, wherein the one or more instructions are NOP instructions.

21. A computer program product in a computer readable medium for performing an integer divide operation in a data processing device, comprising:
first instructions for receiving a call to an integer divide routine;
second instructions for creating instruction bundles for the integer divide routine; and
third instructions for replacing one or more instructions in the instruction bundles with an integer divide check operation.

22. The computer program product of claim 21, wherein the data processing device has an IA64 architecture.

23. The computer program product of claim 21, wherein the integer divide check operation is one of checking for a positive denominator being greater than a positive numerator, a denominator being equal to the numerator, a positive numerator and a denominator being 10, a divide by 1, and division of powers of 2.

24. The computer program product of claim 21, wherein the third instructions for replacing one or more instructions in the instruction bundles with an integer divide check operation are executed based on a priority order of one or more integer divide check operations.

25. The computer program product of claim 21, wherein the computer program product is executed in a Java Virtual Machine on the data processing device.

26. The computer program product of claim 21, wherein the integer divide check operation is a check for an integer divide condition that is typically encountered.

27. The computer program product of claim 21, further comprising:
fourth instructions for checking the integer divide operation using the integer divide check operation; and
fifth instructions for returning a result of the integer divide operation based on a positive outcome of checking the integer divide operation using the integer divide check operation, wherein the result is returned without completing execution of the integer divide routine, and wherein the result is a result that would have been obtained had execution of the integer divide routine been permitted to complete.

28. The computer program product of claim 21, wherein the integer divide check operation short-circuits the integer divide routine when a result of the integer divide check operation is positive, to thereby output a result without completing the execution of the integer divide routine, wherein the result is a result that would have been obtained had execution of the integer divide routine been permitted to complete.

29. The computer program product of claim 21, wherein the third instructions for replacing one or more instructions with an integer divide check operation are executed repeatedly.

30. The computer program product of claim 21, wherein the one or more instructions are NOP instructions.

* * * * *